United States Patent
Firoiu et al.

(10) Patent No.: US 7,158,480 B1
(45) Date of Patent: Jan. 2, 2007

(54) FEEDBACK OUTPUT QUEUING SYSTEM, APPARATUS, AND METHOD

(75) Inventors: Victor Firoiu, Westford, MA (US); Eric Haversat, Tewksbury, MA (US); Thomas O. Holtey, Newton, MA (US)

(73) Assignee: Nortel Networks Limited (CA)

( * ) Notice: Subject to any disclaimer, the term of this patent is extended or adjusted under 35 U.S.C. 154(b) by 889 days.

(21) Appl. No.: 10/079,923

(22) Filed: Feb. 20, 2002

Related U.S. Application Data

(60) Provisional application No. 60/308,960, filed on Jul. 30, 2001.

(51) Int. Cl.
*H04L 12/26* (2006.01)
(52) U.S. Cl. ........................ 370/235; 370/413
(58) Field of Classification Search .............. 370/232, 370/235, 412, 413
See application file for complete search history.

(56) References Cited

U.S. PATENT DOCUMENTS

| | | | |
|---|---|---|---|
| 6,252,848 B1 * | 6/2001 | Skirmont | 370/229 |
| 6,657,962 B1 * | 12/2003 | Barri et al. | 370/235 |
| 6,671,258 B1 * | 12/2003 | Bonneau | 370/235 |
| 2001/0033581 A1 * | 10/2001 | Kawarai et al. | 370/468 |
| 2001/0047423 A1 * | 11/2001 | Shao et al. | 709/235 |
| 2002/0009051 A1 * | 1/2002 | Cloonan | 370/232 |
| 2002/0107908 A1 * | 8/2002 | Dharanikota | 709/203 |
| 2002/0110134 A1 * | 8/2002 | Gracon et al. | 370/412 |
| 2002/0122386 A1 * | 9/2002 | Calvignac et al. | 370/230 |
| 2004/0037223 A1 * | 2/2004 | Harrison et al. | 370/235 |

* cited by examiner

*Primary Examiner*—Hassan Kizou
*Assistant Examiner*—Mohammad S. Adhami
(74) *Attorney, Agent, or Firm*—McGuinness & Manaras LLP

(57) ABSTRACT

A feedback output queuing system, apparatus, and method controls the rate at which packets are forwarded from the ingress ports to a particular output queue over the switching/routing fabric based upon the level of congestion at the output queue. The output queue is monitored and the level of congestion at the output queue is determined based upon a predetermined congestion determination mechanism. An ingress forwarding scheme is determined based upon the level of congestion at the output queue. Information is forwarded from the ingress ports to the output queue based upon the ingress forwarding scheme.

25 Claims, 5 Drawing Sheets

FEEDBACK OUTPUT QUEUING SYSTEM, APPARATUS, AND METHOD

PRIORITY

The present application claims priority from U.S. Provisional Patent Application No. 60/308,960 entitled SYSTEM, APPARATUS, AND METHOD FOR FEEDBACK OUTPUT QUEUING, filed on Jul. 30, 2001 in the names of Victor Firoiu, Eric Haversat, and Tom Holtey, which is hereby incorporated herein by reference in its entirety.

FIELD OF THE INVENTION

The present invention relates generally to communication systems, and more particularly to feedback output queuing in a communication system.

BACKGROUND OF THE INVENTION

In today's information age, communication networks are used to carry vast amounts of information among network users. These communication networks include various types of networking devices, such as switches and routers. The networking devices typically include multiple ports that are interconnected over a switching/routing fabric. An information packet received over an ingress (input) port may be forwarded to an egress (output) port over the fabric, for example, based upon an address or label in the packet.

Congestion can occur at various locations with a networking device. For example, congestion can occur at the ingress ports, at the egress ports, in the switching/routing fabric, and at other locations within the networking device (e.g., backplane). This congestion can lead to dropped packets, which in turn can result in a broken service level agreement. Such a networking device cannot provide a reliable quality of service (QoS).

A "backpressure" mechanism can be used to provide a more reliable QoS in such a networking device. In a "backpressure" mechanism, congestion information is propagated back from the egress queues to the switching/routing fabric and further back to the ingress logic (PIDs). This "backpressure" mechanism requires a significant amount of information, such as a port and virtual lane (VL) identifier for each congested queue, as well as a significant change in the line card and switch fabric architectures. For these reasons, a "backpressure" mechanism is inefficient and difficult to implement.

SUMMARY OF THE INVENTION

In accordance with one aspect of the invention, a feedback output queuing system, apparatus, and method controls the rate at which packets are forwarded from the ingress ports to a particular output queue over the switching/routing fabric based upon the level of congestion at the output queue. The output queue is monitored and the level of congestion at the output queue is determined based upon a predetermined congestion determination mechanism. An ingress forwarding scheme is determined based upon the level of congestion at the output queue. Information is forwarded from the ingress ports to the output queue based upon the ingress forwarding scheme.

In an exemplary embodiment of the present invention, the ingress forwarding scheme is based upon an ingress drop probability. The ingress drop probability is determined according to the level of congestion at the output queue. Packets are dropped at the input ports with probability equal to the ingress drop probability. The ingress drop probability is increased when the level of congestion at the output queue increases and is decreased when the level of congestion at the output queue decreases.

In accordance with another aspect of the invention, a feedback output queuing method involves determining a level of congestion at an output queue, determining an ingress drop probability for an input queue based upon the level of congestion at the output queue, and dropping information destined for the output queue with a probability substantially equal to the ingress drop probability for the input queue. Determining the level of congestion at the output queue typically involves collecting congestion information for the output queue, computing a running time average of the output queue size, and deriving a drop probability for the output queue based upon the running time average of the output queue size. Determining the ingress drop probability for the input queue based upon the level of congestion at the output queue may involve determining that the drop probability for the output queue is greater than a first predetermined threshold and increasing the ingress drop probability for the input queue to a first predetermined value. Determining the ingress drop probability for the input queue based upon the level of congestion at the output queue may involve determining that the drop probability for the output queue is less than a second predetermined threshold and decreasing the ingress drop probability for the input queue to a second predetermined value. Determining the ingress drop probability for the input queue based upon the level of congestion at the output queue may involve maintaining a step number for the output queue, the step number indicating an ingress drop probability level having a corresponding ingress drop probability, initializing the step number for the output queue to a predetermined initial step number, setting the ingress drop probability for the input queue equal to an ingress drop probability corresponding to the initial step number, monitoring changes in the level of congestion at the output queue, incrementing the step number for the output queue and setting the ingress drop probability for the input queue equal to an ingress drop probability corresponding to the incremented step number, if the level of congestion at the output queue is greater than a first predetermined threshold, and decrementing the step number for the output queue and setting the ingress drop probability for the input queue equal to an ingress drop probability corresponding to the decremented step number, if the level of congestion at the output queue is less than a second predetermined threshold. The step number for the output queue may be maintained at the input queue or the output queue. Determining the ingress drop probability for the input queue based upon the level of congestion at the output queue typically involves determining thresholds T and h, determining a number of ingress drop probability levels n, where:

$$n = \lceil \log_{\frac{1-T}{1-h}}(1/N) \rceil,$$

and determining an ingress drop probability $s_n$ for each ingress drop probability level n, where:

$$sn = 1 - \left(\frac{1-T}{1-h}\right)^n.$$

In accordance with yet another aspect of the invention, a feedback output queuing system includes egress logic for maintaining an output queue and determining a level of congestion at the output queue and ingress logic for dropping information destined for the output queue with an ingress drop probability based upon the level of congestion at the output queue. The egress logic typically collects congestion information for the output queue, computes a running time average of the output queue size, and derives a drop probability for the output queue based upon the running time average of the output queue size, the drop probability indicating the level of congestion at the output queue. The egress logic may determine that the drop probability for the output queue is greater than a first predetermined threshold and send a message to the ingress logic requesting an increase in the ingress drop probability. The ingress logic may determine the increase in the ingress drop probability, or the egress logic may determine the increase in the ingress drop probability and indicate the increase in the ingress drop probability to the ingress logic in the message. The egress logic may determine that the drop probability for the output queue is less than a second predetermined threshold and send a message to the ingress logic requesting a decrease in the ingress drop probability. The ingress logic may determine the decrease in the ingress drop probability, or the egress logic may determine the decrease in the ingress drop probability and indicate the decrease in the ingress drop probability to the ingress logic in the message. The ingress logic or the egress logic may maintain a step number for the output queue indicating an ingress drop probability level having a corresponding ingress drop probability.

In accordance with still another aspect of the invention, a feedback output queuing apparatus includes egress logic for maintaining an output queue and determining a level of congestion at the output queue and ingress logic for dropping information destined for the output queue with an ingress drop probability based upon the level of congestion at the output queue. The egress logic typically collects congestion information for the output queue, computes a running time average of the output queue size, and derives a drop probability for the output queue based upon the running time average of the output queue size, the drop probability indicating the level of congestion at the output queue. The egress logic may determine that the drop probability for the output queue is greater than a first predetermined threshold and send a message to the ingress logic requesting an increase in the ingress drop probability. The ingress logic may determine the increase in the ingress drop probability, or the egress logic may determine the increase in the ingress drop probability and indicate the increase in the ingress drop probability to the ingress logic in the message. The egress logic may determine that the drop probability for the output queue is less than a second predetermined threshold and send a message to the ingress logic requesting a decrease in the ingress drop probability. The ingress logic may determine the decrease in the ingress drop probability, or the egress logic may determine the decrease in the ingress drop probability and indicate the decrease in the ingress drop probability to the ingress logic in the message. The ingress logic or the egress logic may maintain a step number for the output queue indicating an ingress drop probability level having a corresponding ingress drop probability.

DETAILED DESCRIPTION OF A PREFERRED EMBODIMENT

Figure 1:
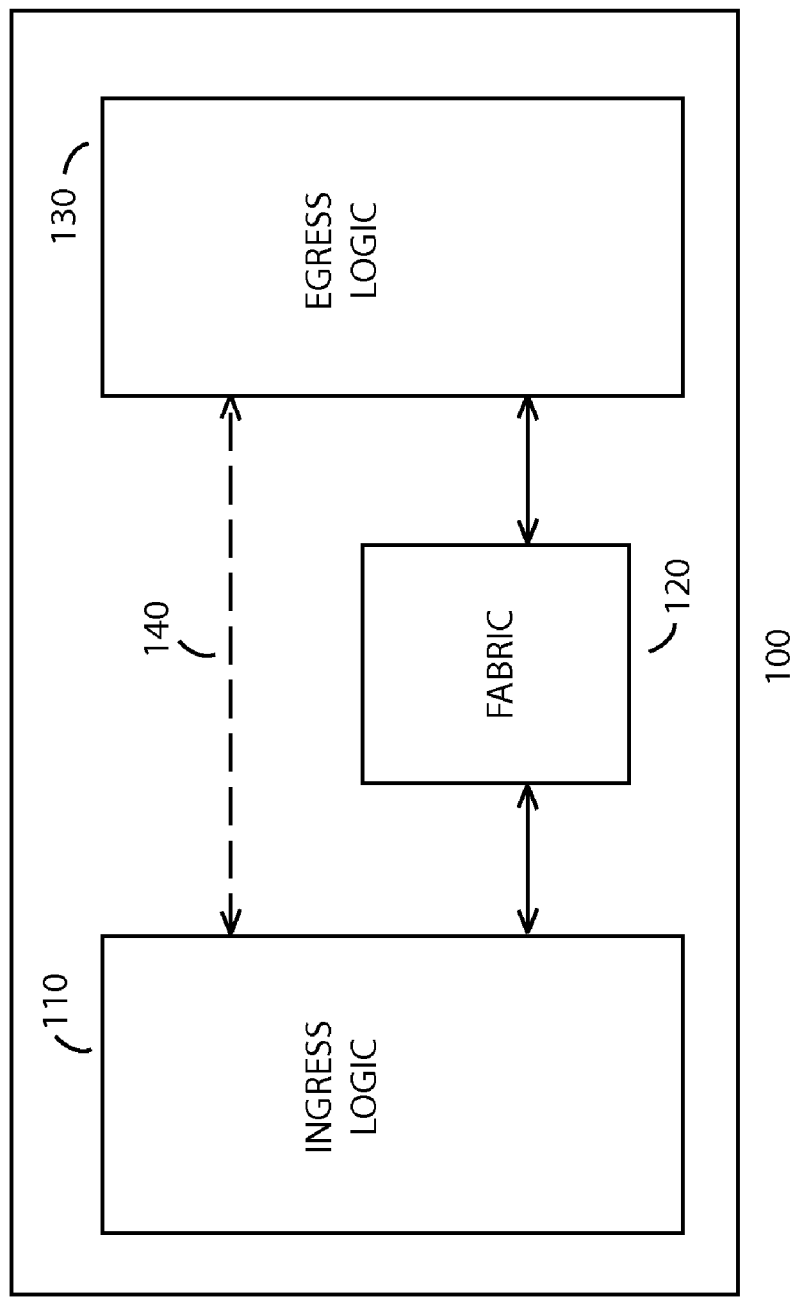
FIG. 1 is a block diagram showing the relevant components of an exemplary networking device in accordance with an embodiment of the present invention.

An embodiment of the present invention uses a feedback mechanism (referred to hereinafter as a Feedback Output Queuing or FOQ mechanism) to provide Quality of Service (QoS) and congestion management in a networking device such as a switch or router. A typical networking device implements output queuing (i.e., where packets are queued at the output ports), and may also implement input queuing (i.e., where packets are queued at the input ports for forwarding over the switching/routing fabric). The FOQ mechanism controls the rate at which packets are forwarded from the ingress ports to a particular output queue over the switching/routing fabric based upon the level of congestion at the output queue. Specifically, the FOQ mechanism monitors the output queue and determines the level of congestion at the output queue based upon a predetermined congestion determination mechanism. The FOQ mechanism determines an ingress forwarding scheme for forwarding packets to the output queue based upon the level of congestion at the output queue.

In an exemplary embodiment of the present invention, the ingress forwarding scheme is based upon an ingress drop probability. Specifically, the FOQ mechanism determines an ingress drop probability for packets destined for the output queue based upon the level of congestion at the output queue. Packets destined for the output queue are then dropped at the ingress port with probability equal to that ingress drop probability. If congestion increases at the output queue above a predetermined threshold, then the ingress drop probability is increased. If congestion decreases at the output queue below a predetermined threshold, then the ingress drop probability is decreased.

In an exemplary embodiment of the present invention, the predetermined congestion determination mechanism is based upon a random early detection (RED) mechanism. RED is an active queue management mechanism that is designed to avoid traffic congestion in a network node by randomly dropping packets before buffer overflow occurs.

RED is designed to accompany transport-layer congestion control protocols such as TCP and operates as a mechanism for regulating the amount of information that is sent to a node by decreasing the number of acknowledgment packets that are sent to the sender. The congestion control mechanism in TCP is a closed control system that reacts to unacknowledged packets by re-sending the unacknowledged packets and reducing the transmission rate. The random dropping of packets during a congestion condition helps to avoid the global synchronization to TCP flows and therefore helps to achieve a higher throughput.

RED has a series of parameters to define a queue management model, including minimum threshold ($q_{min}$ or $Min_{th}$), maximum threshold ($q_{max}$ or $Max_{th}$), maximum drop rate ($p_{max}$ or $Max_p$), buffer size (B), queue sampling rate ($\delta$) and queue weight (w). RED computes a running average queue size $q_{avg}$ from samples of the queue size taken, for example, at every packet arrival or at fixed intervals. When this average queue size $q_{avg}$ is greater than the minimum threshold $q_{min}$, an arriving packet is dropped with a probability (p). Furthermore, when the average queue size $q_{avg}$ is greater than the maximum queue size $q_{max}$, all incoming packets are dropped. By this active queue management mechanism, RED can control the queue size before it is overflowed and avoid global synchronization to TCP flows. On the other hand, RED also allows temporary bursts of traffic through the time difference between the increase in queue size and the increase in the average queue size.

FIG. 1 is a block diagram showing the relevant components of an exemplary networking device 100. Among other things, the networking device 100 includes ingress logic 110, fabric 120, egress logic 130, and a control interface 140. The ingress logic 110 supports a number of ingress ports through which information is received. The egress logic 130 supports a number of egress ports through which information is forwarded. Information received by the ingress logic 110 may be forwarded to the egress logic 130 over the fabric 120 according to some predetermined forwarding scheme. The forwarding scheme can include, among other things, traditional Internet Protocol (IP) routing, Virtual Local Area Networking (VLAN), and Multiprotocol Label Switching (MPLS). For convenience, a forwarding path from the ingress logic 110 to the egress logic 130 (such as an IP route, a VLAN, or MPLS label switched path) is referred to hereinafter as a Virtual Lane (VL). The ingress logic 110 and egress logic 130 exchange control information over the control interface 140 (e.g., a backplane or dedicated control plane).

The networking device 100 typically supports QoS as per-flow rate limitation at ingress ports and as per-VL minimum rate guarantee at egress ports. The networking device 100 typically also supports a set of priority levels for expedited and control traffic. VLs can also have a maximum rate limitation at the egress ports.

Within the networking device 100, information can pass through the ingress logic 110 and fabric 120 essentially unhindered. Congestion can occur, however, at various points within the egress logic 130, and particularly at output queues associated with each VL. When an output queue is full, additional packets are dropped indiscriminately.

In an embodiment of the present invention, a FOQ mechanism is used to avoid sustained indiscriminate packet drops. The FOQ mechanism detects congestion at the egress ports and instructs the ingress ports to drop packets directed to the congested egress ports before they reach the egress ports. The egress logic 130 provides this feedback information to the ingress logic 120 over the control interface 140. The feedback information typically includes, among other things, a VL identifier and a port identifier. The feedback information is typically sent much less frequently than a packet transmission time, for example, on the order of 1 ms to 10 ms.

More specifically, the egress logic 130 maintains an output queue for each VL and collects congestion information regarding the output queues, for example, at the scheduling point where the full traffic identity (port and VL) and congestion status is known. The egress logic 130 runs a RED mechanism for each VL queue at each egress port.

The RED mechanism computes a running time average of the queue size and derives a probability for dropping packets as an increasing function of this average queue size. If the RED packet drop probability p reaches a predetermined threshold T, then the egress logic 130 sends a message to the ingress logic 110 to drop packets associated with the VL with a probability $s_1$. As a result, p drops to a lower value h. For the same traffic intensity, the combined drop probability is the same in both cases:

$$T = s_1 + h - s_1 h$$

$$s1 = \frac{T-h}{1-h}$$

For example, if T is equal to 0.2 and h is equal to 0.03, then $s_1$ is equal to 0.1752.

If the ingress traffic rate still increases, then the RED drop probability increases and can reach again a threshold T. Again, the egress logic 130 sends a message to the ingress logic 110 to drop packets with a higher probability $s_2$ such that p drops again to h. From the same condition of equal probabilities before and after the ingress drop probability increase:

$$T + S_1 - Ts_1 = S_2 + h - s_2 h$$

$$s2 = \frac{T-h}{1-h} + s1\frac{1-T}{1-h} = \frac{T-h}{1-h}\left(1 + \frac{1-T}{1-h}\right)$$

If the congestion further increases, the process continues to increase the ingress drop rates. It can be shown that, at a step k, the ingress drop probability $s_k$ is:

$$sk = 1 - \left(\frac{1-T}{1-h}\right)^k$$

The FOQ mechanism can stop at the highest possible congestion, which is achieved when all N ingress ports send traffic to one egress port. At that time, a drop probability of (N−1)/N is needed to reduce the total traffic to the rate of a single port. Approximating the ingress drop probability $s_n$ as:

$$s_n \approx s_n + h - s_n h$$

then:

$$s_n = (N-1)/N$$

Thus, the FOQ mechanism needs n steps to cover all congestion cases, where:

$$n = \left\lceil \log_{\frac{1-T}{1-h}}(1/N) \right\rceil$$

For example, assuming T is equal to 0.2, h is equal to 0.03, and N is equal to 16, then the FOQ mechanism needs n equals 15 steps to cover all congestion cases, where:

$s_1$=0.1753
$s_2$=0.3198
$S_3$=0.4390
$s_4$=0.5373
$s_5$=0.6184
$s_6$=0.6853
$s_7$=0.7404
$s_8$=0.7859
$s_9$=0.8235
$s_{10}$=0.8544
$s_{11}$=0.8799
$s_{12}$=0.9010
$s_{13}$=0.9183
$s_{14}$=0.9326
$s_{15}$=0.9444

As long as the drop probability at a VL queue is within the thresholds h . . . T, the egress logic 130 does not change the drop probabilities at the ingress ports. When the drop probability at a VL queue falls below h, the egress logic 130 sends a message to the ingress logic 110 to reduce their drop rate for that VL from the current level $s_n$ to the next lower level $s_{n-1}$. As congestion further decreases, the drop probability eventually reaches the lowest level $s_0$=0 (i.e., no ingress drop). The lower threshold on drop probability h is typically chosen so as to reduce the possibility of unstable behavior when the traffic rate is such that the congestion system is close to changing the ingress drop rate (to an upper or lower level).

Thus, as congestion increases on a particular VL/port, the ingress logic 110 drops packets for that VL/port with successively higher drop probabilities, and as congestion decreases, the ingress logic 110 drops packets with successively lower drop probabilities. The congestion level at the egress queues is used to determine the drop probability at the ingress queues.

It should be noted that the number of steps n and the ingress drop probabilities $s_n$ are typically pre-calculated, although this is not necessary. The pre-calculated ingress drop probabilities can be managed by either the ingress logic 110 or the egress logic 130.

If the pre-calculated ingress drop probabilities are managed by the ingress logic 110, then the egress logic 130 only needs to inform the ingress logic 110 whether to increase or decrease the ingress drop probability for a particular VL/port, and the ingress logic 110 can select the next higher or lower ingress drop probability from the pre-calculated values.

Figure 2:
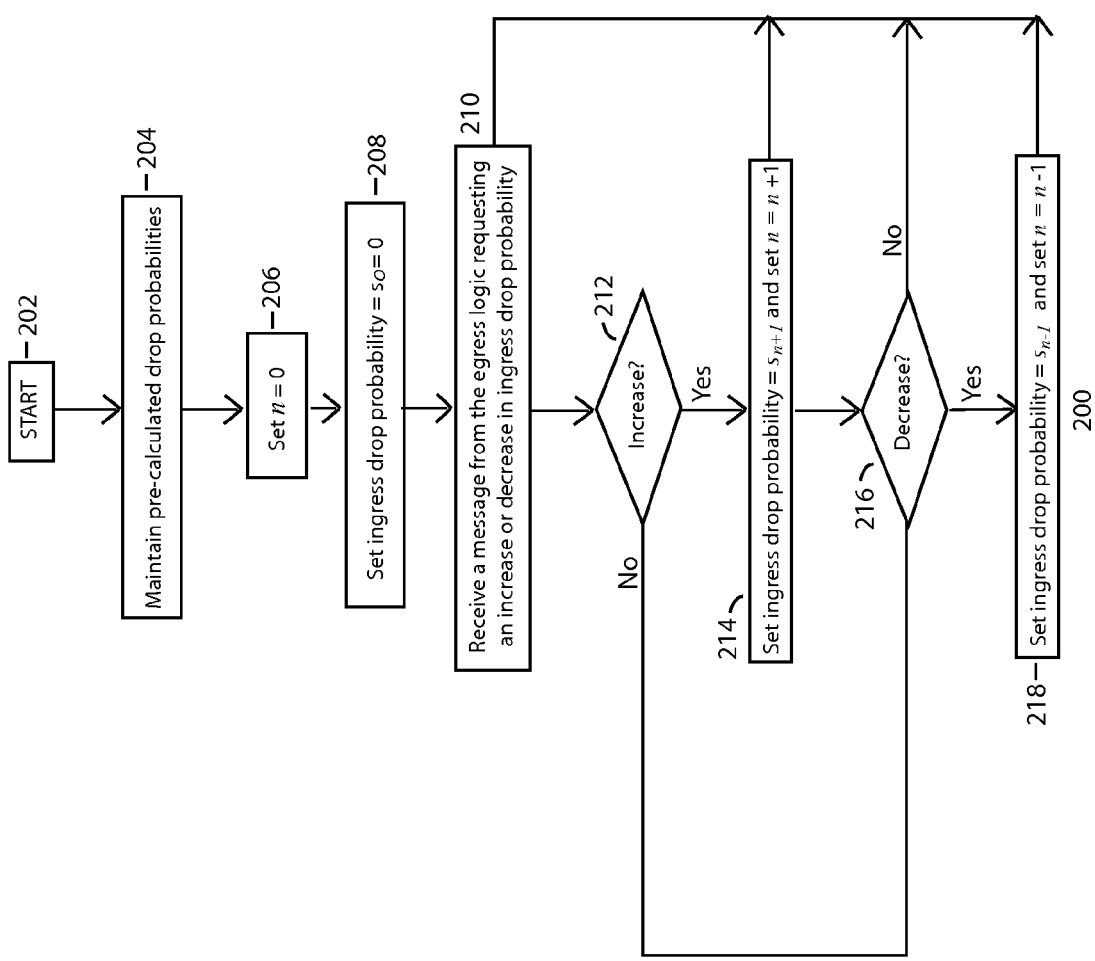
FIG. 2 is a logic flow diagram showing exemplary ingress logic for feedback output queuing in accordance with an embodiment of the present invention in which the ingress logic maintains pre-calculated drop probabilities.

FIG. 2 is a logic flow diagram showing exemplary ingress logic 200 for feedback output queuing in accordance with an embodiment of the present invention in which the ingress logic maintains pre-calculated drop probabilities. Starting in block 202, the logic maintains pre-calculated drop probabilities, in block 204. The logic sets the initial step n associated with a particular VL/port equal to zero, in block 206, and sets the ingress drop probability for that VL/port equal to $s_0$, which equals zero, in block 208.

When the egress logic determines that the ingress drop probability for the VL/port needs to be increased or decreased, the egress logic sends a message to the ingress logic requesting an increase or decrease in the ingress drop probability for the VL/port. Upon receiving the message from the egress logic, in block 210, the logic determines whether the ingress drop probability for the VL/port needs to be increased or decreased. If the ingress drop probability for the VL/port needs to be increased (YES in block 212), then the logic sets the ingress drop probability to $s_{n+1}$ and sets n equal to (n+1), in block 214, and recycles to block 210 to await another message from the egress logic. If the ingress drop probability for the VL/port needs to be decreased (NO in block 212 and YES in block 216), then the logic sets the ingress drop probability to $s_{n-1}$ and sets n equal to (n-1), in block 218, and recycles to block 210 to await another message from the egress logic.

Figure 3:
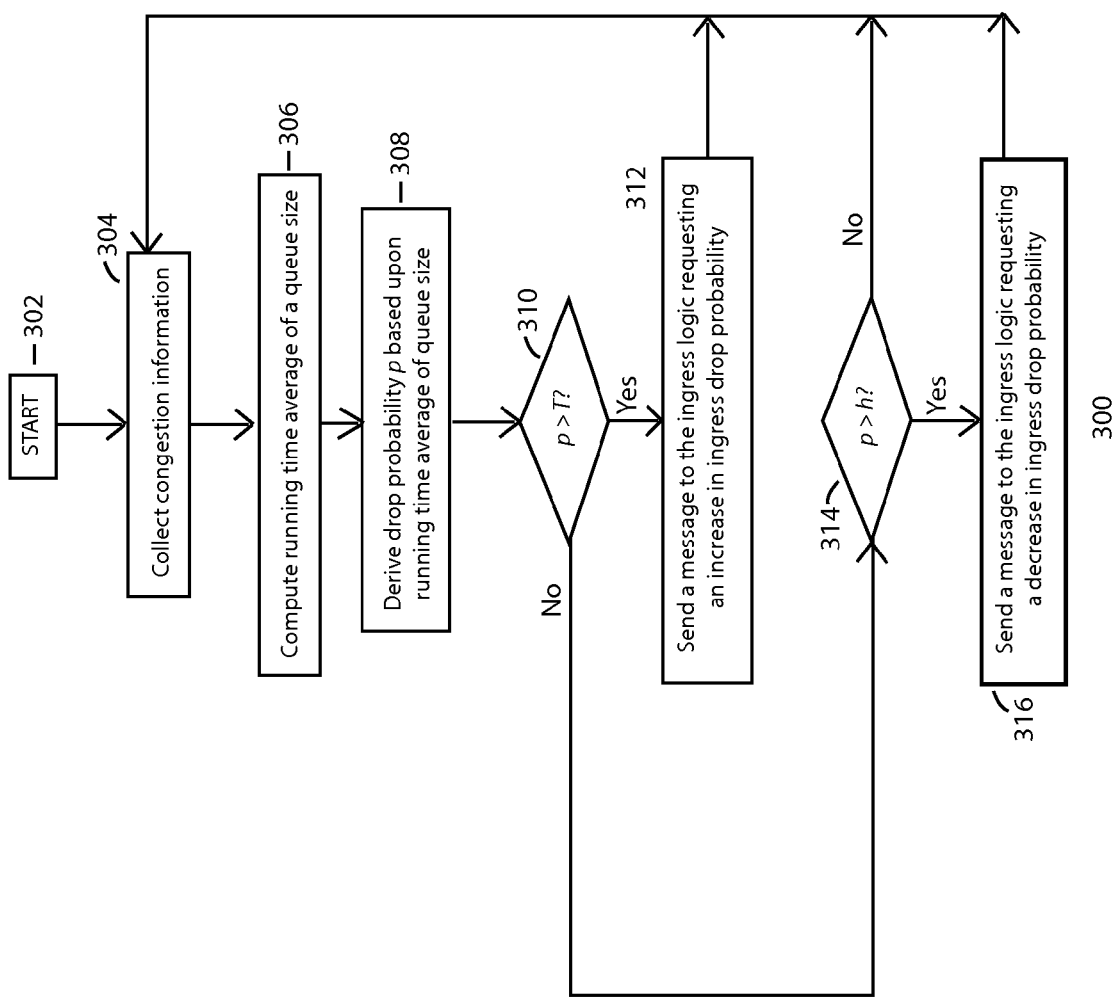
FIG. 3 is a logic flow diagram showing exemplary egress logic for feedback output queuing in accordance with an embodiment of the present invention in which the ingress logic maintains pre-calculated drop probabilities.

FIG. 3 is a logic flow diagram showing exemplary egress logic 300 for feedback output queuing in accordance with an embodiment of the present invention in which the ingress logic maintains pre-calculated drop probabilities. Starting at block 302, the logic collects congestion information for the VL/port, in block 304, and computes a running time average of queue size, in block 306. The logic derives a drop probability p for the VL/port based upon the running time average of queue size, in block 308. The logic then determines whether the ingress drop probability needs to be increased or decreased. If p is greater than a predetermined threshold T (YES in block 310), then the ingress drop probability needs to be increased, so the logic sends a message to the ingress logic requesting an increase in ingress drop probability, in block 312, and recycles to block 304. If p is less than a predetermined threshold h (NO in block 310 and YES in block 314), then the ingress drop probability needs to be decreased, so the logic sends a message to the ingress logic requesting a decrease in ingress drop probability, in block 316, and recycles to block 304.

If the pre-calculated ingress drop probabilities are managed by the egress logic 130, then the egress logic 130 can select the next higher or lower ingress drop probability from the pre-calculated values as the need may be and inform the ingress logic 110 of the actual ingress drop probability for the particular VL/port.

Figure 4:
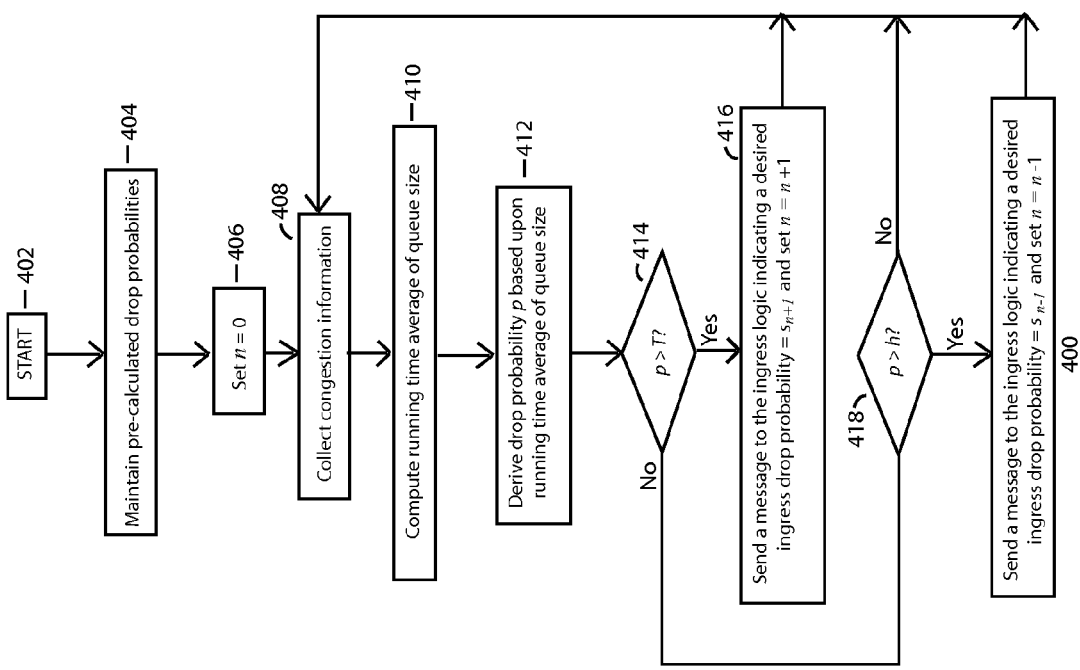
FIG. 4 is a logic flow diagram showing exemplary egress logic for feedback output queuing in accordance with an embodiment of the present invention in which the egress logic maintains pre-calculated drop probabilities.

FIG. 4 is a logic flow diagram showing exemplary egress logic 400 for feedback output queuing in accordance with an embodiment of the present invention in which the egress logic maintains pre-calculated drop probabilities. Starting at block 402, the logic maintains pre-calculated drop probabilities, in block 404. The logic sets the initial step n associated with a particular VL/port equal to zero, in block 406. The logic collects congestion information for the VL/port, in block 408, and computes a running time average of queue size, in block 410. The logic derives a drop probability p for the VL/port based upon the running time average of queue size, in block 412. The logic then determines whether the ingress drop probability needs to be increased or decreased. If p is greater than a predetermined threshold T (YES in block 414), then the ingress drop probability needs to be increased, so the logic sends a message to the ingress logic indicating a desired ingress drop probability of $s_{n+1}$ and sets n equal to (n+1), in block 416, and recycles to block 408. If p is less than a predetermined threshold h (NO in block 414 and YES in block 418), then the ingress drop probability needs to be decreased, so the logic sends a message to the ingress logic indicating a desired ingress drop probability of $s_{n-1}$ and sets n equal to (n-1), in block 420, and recycles to block 408.

Figure 5:
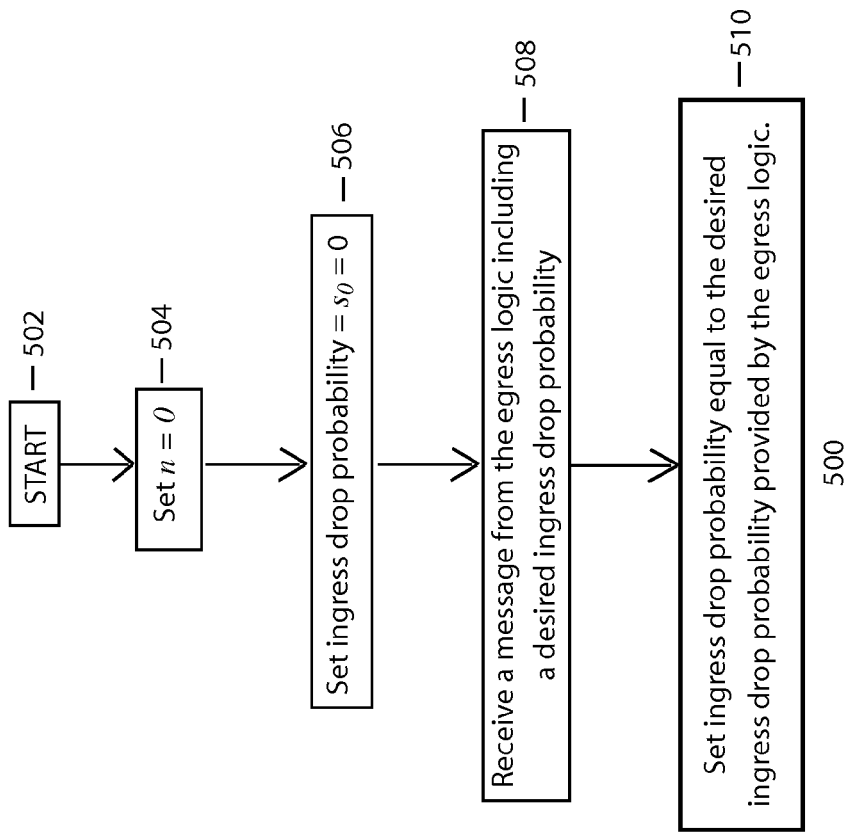
FIG. 5 is a logic flow diagram showing exemplary ingress logic for feedback output queuing in accordance with an embodiment of the present invention in which the egress logic maintains pre-calculated drop probabilities.

FIG. 5 is a logic flow diagram showing exemplary ingress logic 500 for feedback output queuing in accordance with an embodiment of the present invention in which the egress logic maintains pre-calculated drop probabilities. Starting in block 502, the logic sets the initial step n associated with a particular VL/port equal to zero, in block 504, and sets the ingress drop probability for that VL/port equal to $s_0$, which equals zero, in block 506.

When the egress logic determines that the ingress drop probability for the VL/port needs to be increased or decreased, the egress logic sends a message to the ingress logic including a desired ingress drop probability for the VL/port. Upon receiving the message from the egress logic, in block 508, the logic sets the ingress drop probability for the VL/port to the desired ingress drop probability provided by the egress logic, in block 510, and recycles to block 508 to await another message from the egress logic.

It should be noted that the logic flow diagrams describe ingress and egress logic for managing a single VL/port. In a typical embodiment of the present invention, the ingress and egress logic manage multiple VL/ports. A step n and an ingress drop probability $s_n$ are maintained for each VL/port. The egress logic monitors the queue for each VL/port to determine whether the corresponding ingress drop probability needs to be increased or decreased. When the ingress drop probability for a particular VL/port needs to be increased or decreased, the egress logic sends a message to the ingress logic identifying, among other things, the VL/port. The ingress logic uses the VL/port information in the received message to identify the VL/port, and updates the corresponding ingress drop probability for the VL/port accordingly. This mapping of VL/port to step/ingress drop probability was omitted from the logic flow diagrams for the sake of simplicity, although such mapping is generally implemented in embodiments of the present invention.

In an exemplary embodiment of the present invention, the described FOQ mechanism is implemented in a networking device known as a Passport 8600 Release 4. It should be noted that the present invention is in no way limited to the Passport 8600 Release 4 switch/router or to the described implementation. Rather the FOQ mechanism can be implemented for a wide variety of devices and architectures, and it will be apparent to a skilled artisan how the FOQ mechanism can be implemented for any particular device or architecture. The present invention is in no way limited to the described thresholds and drop probabilities, but rather the thresholds and drop probabilities may need to be tailored to a specific implementation based upon such things as queue size, data rate, and traffic type, to name but a few.

It should be noted that the ingress forwarding scheme of the present invention is not limited to an ingress drop probability. The ingress forwarding scheme can control the rate at which packets are forwarded from the ingress ports to the output queue in any of a variety of ways. For example, the ingress forwarding scheme can use a variable rate policer based upon a token bucket or leaky bucket mechanism for controlling the rate at which packets are forwarded to the output queue such that the forwarding rate is decreased when congestion increases at the output queue and the forwarding rate is increased when congestion decreases at the output queue.

It should also be noted that the FOQ mechanism of the present invention can be used with or without input queuing.

It should also be noted that the FOQ mechanism of the present invention is not limited to the use of RED as an output queue management scheme. The FOQ mechanism can use other output queue management schemes, such as a tail drop scheme in which packets are dropped from the output queue only when the output queue is full.

It should also be noted that the congestion determination mechanism of the present invention is not limited to measurement of output queue size and/or output drop probability. Generally speaking, output congestion occurs when the data rate into the output queue is greater than the data rate out of the output queue. The congestion determination mechanism can determine the level of congestion at the output queue in any of a variety of ways. For example, the congestion determination mechanism can determine the level of congestion at the output queue based upon the input and output rates of the output queue.

It should be noted that the terms such as "switch" and "router" are used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

The described logic should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the congestion management logic is implemented as a set of computer program instructions that is converted into a computer executable form, stored as such in a computer readable medium, and executed by a microprocessor within the switch/router under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A feedback output queuing method comprising:
   determining a level of congestion at an output queue of a network device;
   determining an ingress queue drop probability for an ingress queue associated with an ingress port of the network device based upon the level of congestion at the output queue; and
   dropping packets at the ingress port of the network device according to the ingress drop probability to reduce congestion at the output queues,
   wherein determining an ingress queue drop probability based upon the level of congestion at the output queue comprises:
   determining thresholds T and h;
   determining a number of ingress drop probability levels n, where:

$$n = \left\lceil \log_{\frac{1-T}{1-h}}(1/N) \right\rceil;$$

and
   determining an ingress drop probability $S_n$ for each ingress drop probability level n, where:

$$sn = 1 - \left(\frac{1-T}{1-h}\right)^n.$$

2. The method of claim 1, wherein determining the level of congestion at the output queue comprises:
   collecting congestion information for the output queue;
   computing a running time average of the output queue size; and deriving a drop probability for the output queue based upon the running time average of the output queue size.

3. The method of claim 1, wherein determining the level of congestion at the output queue comprises:
   monitoring an input data rate to the output queue; and
   monitoring an output data rate from the output queue.

4. The method of claim 1, wherein determining an ingress queue drop probability comprises:
   determining a forwarding rate for forwarding information to the output queue based upon the level of congestion at the output queue.

5. The method of claim 1, wherein determining an ingress queue drop probability for the ingress queue associated with the ingress port of the network device comprises:
   maintaining a step number for the output queue, the step number indicating an ingress drop probability level having a corresponding ingress drop probability;
   initializing the step number for the output queue to a predetermined initial step number;
   setting the ingress drop probability for the input queue equal to an ingress drop probability corresponding to the initial step number;
   monitoring changes in the level of congestion at the output queue;
   incrementing the step number for the output queue and setting the ingress drop probability for the input queue equal to an ingress drop probability corresponding to the incremented step number, if the level of congestion at the output queue is greater than a first predetermined threshold; and
   decrementing the step number for the output queue and setting the ingress drop probability for the input queue equal to an ingress drop probability corresponding to the decremented step number, if the level of congestion at the output queue is less than a second predetermined threshold.

6. The method of claim 5, wherein the step number for the output queue is maintained at an ingress port.

7. The method of claim 5, wherein the step number for the output queue is maintained at the output queue.

8. The method of claim 1, wherein determining an ingress queue drop probability based upon the level of congestion at the output queue comprises:
determining that the level of congestion at the output queue has increased; and
increasing the ingress queue drop probability.

9. The method of claim 1, wherein determining the ingress queue drop probability based upon the level of congestion at the output queue comprises:
determining that the level of congestion at the output queue has decreased; and decreasing the ingress queue drop probability.

10. The method of claim 4, wherein determining a forwarding rate for forwarding information to the output queue based upon the level of congestion at the output queue comprises:
determining that the level of congestion at the output queue has increased; and
decreasing the forwarding rate.

11. The method of claim 4, wherein determining a forwarding rate for forwarding information to the output queue based upon the level of congestion at the output queue comprises:
determining that the level of congestion at the output queue has decreased; and increasing the forwarding rate.

12. A feedback output queuing system comprising:
egress logic operably coupled to maintain an output queue of a network device and to determine a level of congestion at the output queue; and
ingress logic operably coupled to control the rate at which information is forwarded to the output queue using an ingress forwarding scheme that is based upon the level of congestion at the output queue;
wherein the ingress logic is also coupled to an ingress queue of the network device for controlling an ingress queue drop rate based upon the level of congestion at the output queue; and
wherein the ingress logic is operably coupled to drop information at an ingress queue when the information is destined for the output queue at an ingress drop probability that is determined by:
determining thresholds T and h;
determining a number of ingress drop probability levels n, where:

$$n = \left\lceil \log_{\frac{1-T}{1-h}}(1/N) \right\rceil;$$

and
determining an ingress drop probability Sn for each ingress drop probability level n, where $$sn = 1 - \left(\frac{1-T}{1-h}\right)^n.$$

13. The system of claim 12, wherein the egress logic is operably coupled to determine the level of congestion at the output queue by collecting congestion information for the output queue, computing a running time average of the output queue size, and deriving a drop probability for the output queue based upon the running time average of the output queue size, the drop probability indicating the level of congestion at the output queue.

14. The system of claim 12, wherein the egress logic is operably coupled to determine the level of congestion at the output queue by monitoring an input data rate to the output queue and monitoring an output data rate from the output queue.

15. The system of claim 12, wherein the ingress logic is operably coupled to determine the ingress forwarding scheme based upon output queue congestion information provided by the egress logic.

16. The system of claim 12, wherein the egress logic is operably coupled to determine the ingress forwarding scheme and provide the ingress forwarding scheme to the ingress logic.

17. The system of claim 12, wherein the ingress drop probability is determined based upon the level of congestion at the output queue.

18. The system of claim 12, wherein the ingress logic is operably coupled to forward information to the output queue at a forwarding rate that is determined based upon the level of congestion at the output queue.

19. The system of claim 17, wherein the ingress drop probability is determined by maintaining a step number for the output queue, the step number indicating an ingress drop probability level having a corresponding ingress drop probability; initializing the step number for the output queue to a predetermined initial step number; setting the ingress drop probability for the input queue equal to an ingress drop probability corresponding to the initial step number; monitoring changes in the level of congestion at the output queue; incrementing the step number for the output queue and setting the ingress drop probability for the input queue equal to an ingress drop probability corresponding to the incremented step number, if the level of congestion at the output queue is greater than a first predetermined threshold; and decrementing the step number for the output queue and setting the ingress drop probability for the input queue equal to an ingress drop probability corresponding to the decremented step number, if the level of congestion at the output queue is less than a second predetermined threshold.

20. The system of claim 19, wherein the step number for the output queue is maintained by the ingress logic.

21. The system of claim 19, wherein the step number for the output queue is maintained by the egress logic.

22. The system of claim 17, wherein the ingress drop probability is increased when the level of congestion at the output queue increases.

23. The system of claim 17, wherein the ingress drop probability is decreased when the level of congestion at the output queue decreases.

24. The system of claim 18, wherein the forwarding rate is decreased when the level of congestion at the output queue increases.

25. The system of claim 18, wherein the forwarding rate is increased when the level of congestion at the output queue decreases.

* * * * *